UNITED STATES PATENT OFFICE.

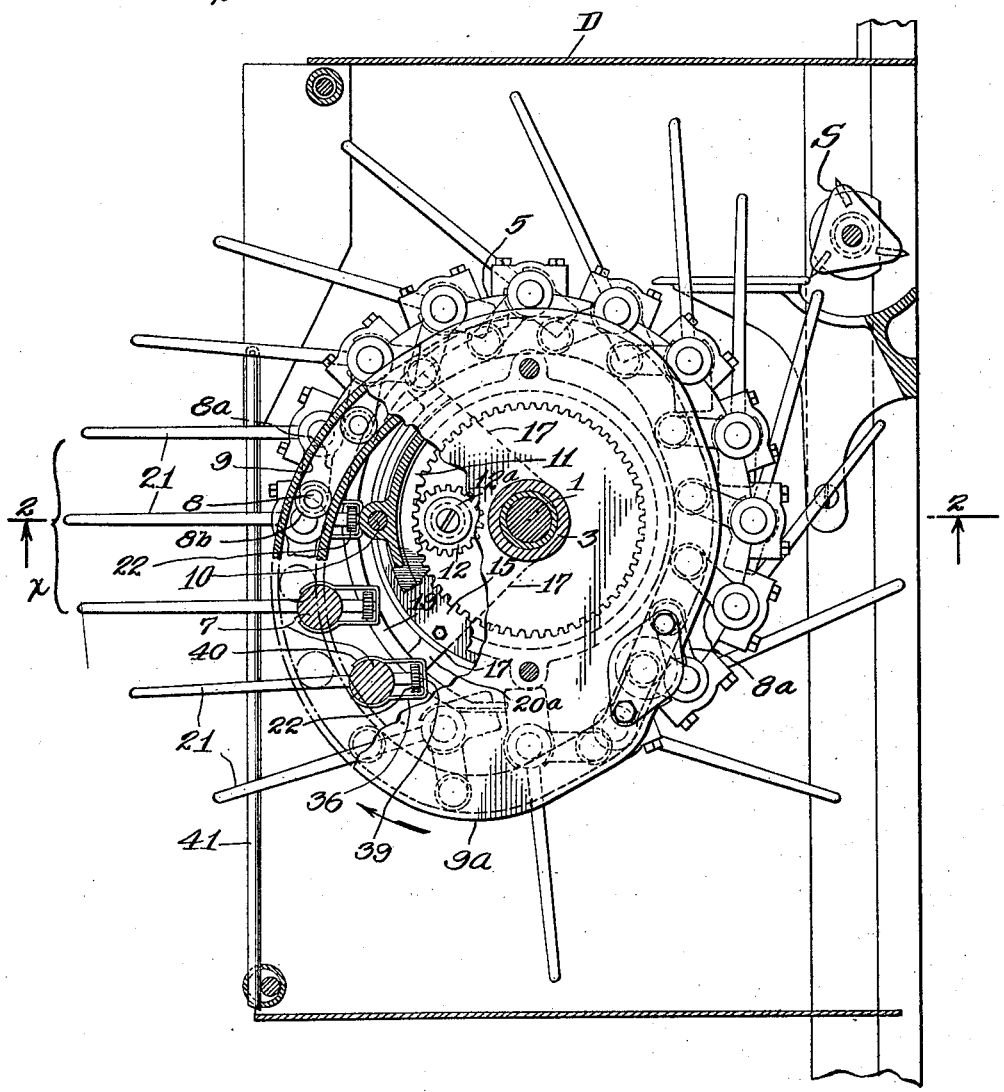

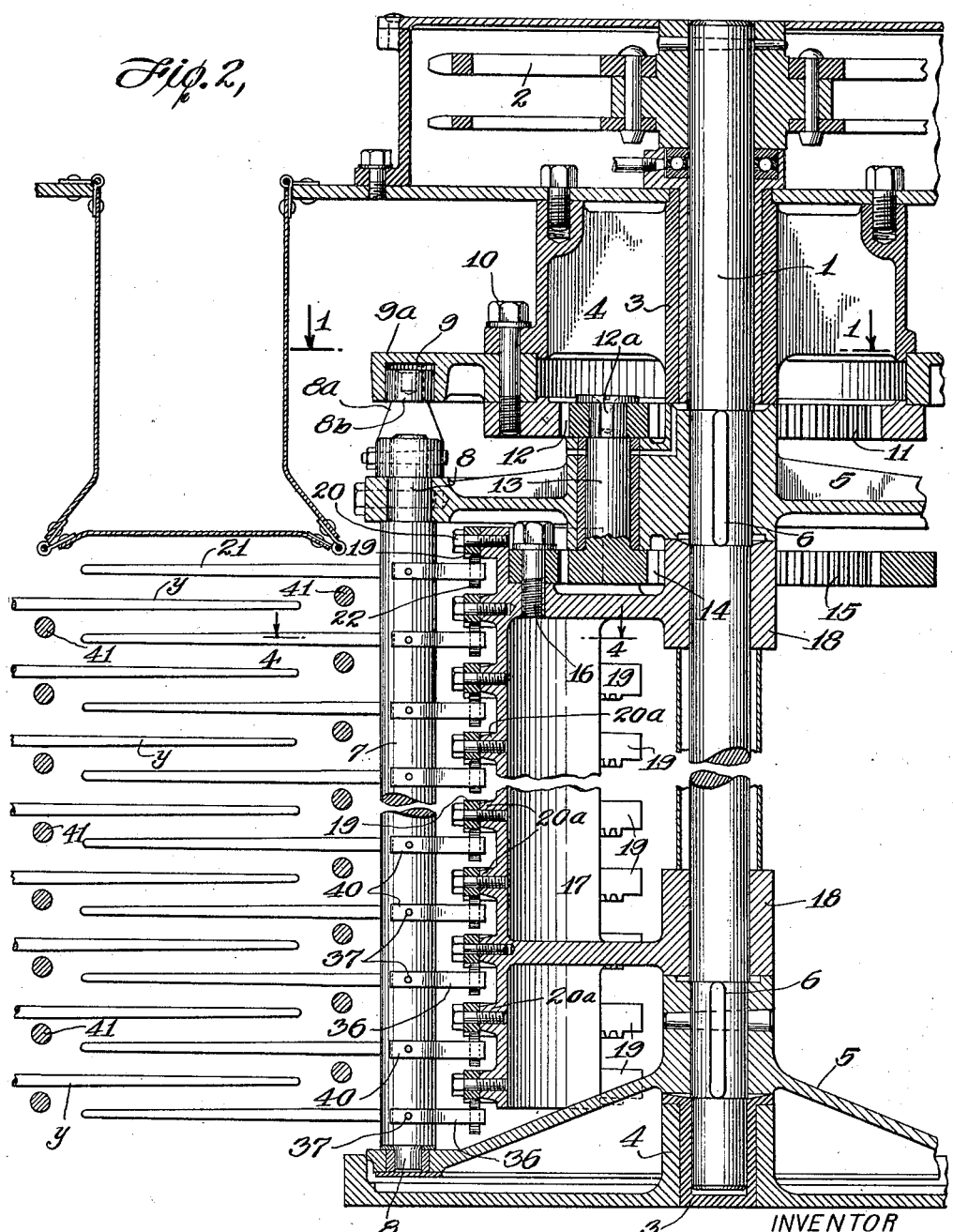

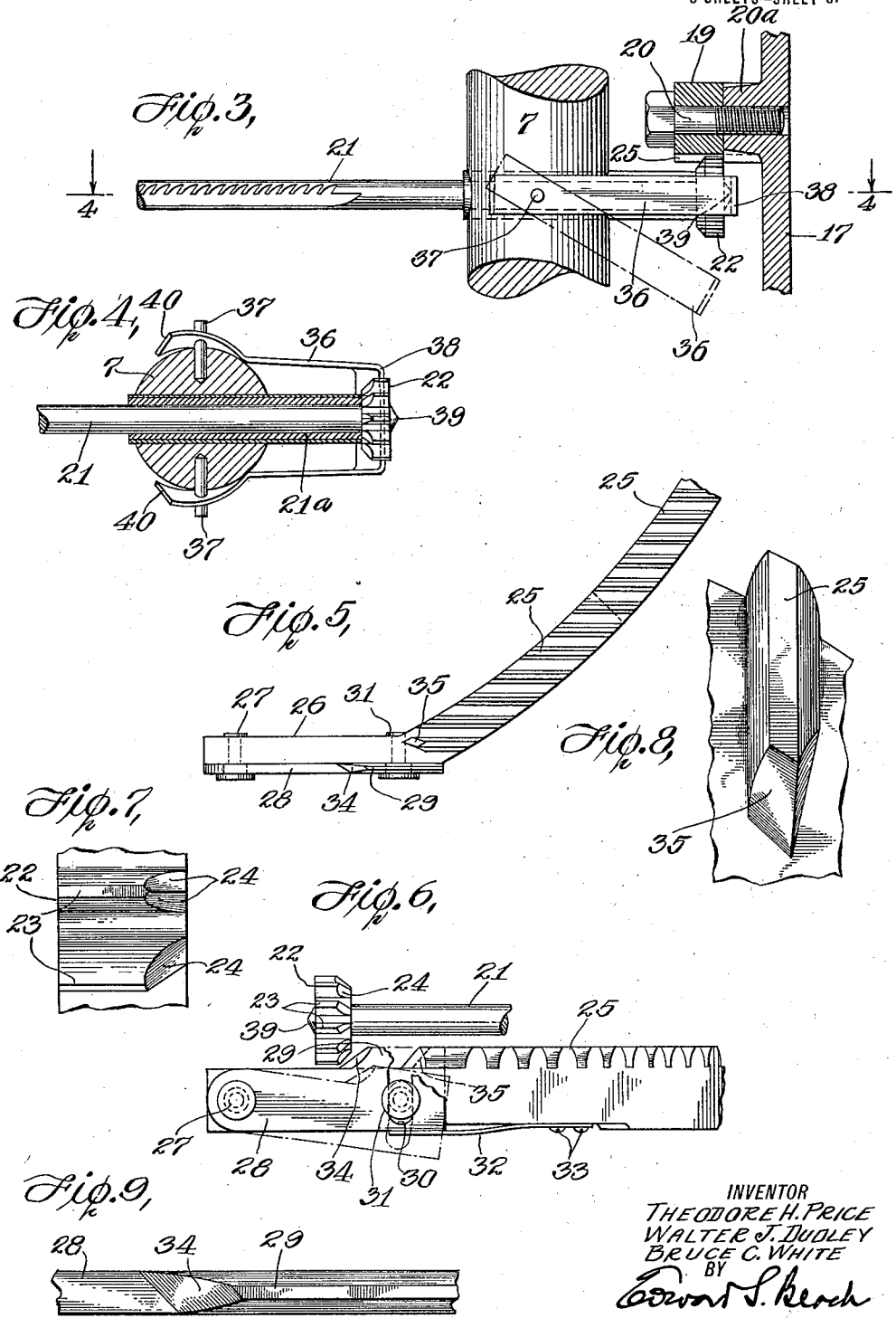

THEODORE H. PRICE AND BRUCE CLARK WHITE, OF NEW YORK, AND WALTER J. DUDLEY, OF BROOKLYN, NEW YORK; SAID WHITE AND SAID DUDLEY ASSIGNORS TO SAID PRICE.

COTTON-PICKER.

1,387,176.      Specification of Letters Patent.      Patented Aug. 9, 1921.

Application filed December 7, 1917, Serial No. 206,080. Renewed January 27, 1921. Serial No. 440,491.

*To all whom it may concern:*

Be it known that we, THEODORE H. PRICE and BRUCE CLARK WHITE, residing in the city, county, and State of New York, and WALTER J. DUDLEY, residing in the borough of Brooklyn, city of New York, county of Kings, and State of New York, all citizens of the United States, have invented certain new and useful Improvements in Cotton-Pickers, of which the following is a specification.

This invention relates to improvements in cotton pickers of the type which straddles a row of cotton plants and which has revoluble cotton-picking fingers which in the forward movement of the machine are moved bodily rearward through the plant, the picking mechanism and plant being relatively stationary, and of which the picking fingers severally pass into working relation to a cotton stripper by means of which the cotton is withdrawn from the picker fingers which continue in an endless course and again return into cotton-picking position. The objects of this invention are mainly to produce a simple and low-cost picker-finger actuating mechanism that will facilitate the entrance of picker-finger pinions into engagement with rack teeth with which the picker-finger pinions coöperate during the cotton-picking action of the fingers; and further to provide the picker fingers, which are detachable, with a bail for restaining butt endwise movement of the cotton-picker fingers when they are in use.

In the accompanying drawings forming a part hereof,

Figure 1 is a top plan view of a picker-finger actuating mechanism located vertically in one of the side drums of a machine, and embodying our invention. A part of this figure is broken away for greater clearness, and a part of it is in horizontal section at line 1—1 of Fig. 2.

Fig. 2 is a vertical elevation, partly in section at line 2—2 of Fig. 1.

Fig. 3 is an elevational detail, partly in section at line 3—3 of Fig. 1, and shows a picker-finger pinion in mesh with a stationary rack. It also shows in full lines a picker-finger bail in place, and in dotted lines shows the picker-finger bail in inoperative position.

Fig. 4 is a view partly in section at line 4—4 of Fig. 3, with the bail in inoperative position.

Fig. 5 is an under plan view of the picker-finger rack and its spring-controlled tooth.

Fig. 6 is a side elevational view of a portion of the rack and its spring-controlled tooth, and shows a portion of a picker finger with its pinion removed out of engagement with the teeth of the rack. The parts illustrated in this figure are shown upside-down.

Fig. 7 is an enlarged view of one of the picker-finger pinion teeth.

Fig. 8 is an enlarged view of the inward end of one of the rack teeth; and

Fig. 9 is an enlarged view of the inward end of the spring-controlled tooth.

In the accompanying drawings, 1 is the carrier wheel shaft shown provided with a driving sprocket 2 and mounted vertically in upper and under bearings 3 each of which is in a stationary frame member 4. The shaft 1 is provided with an upper and with an under horizontal circular carrier wheel 5 of equal diameters and each fixed to the shaft 1 by a key 6. The pair of carrier wheels 5 spaced apart in the vertical direction support adjacent their peripheries a series of vertical carriers 7 each of shaft-like form and the upper and under ends 8 of each of which are journaled in sockets in the carrier wheels. The carriers 7 are freely revoluble each on its vertical axis and each has at its upper end a cam arm $8^a$ carrying a cam roll $8^b$ which works in a continuous cam groove 9 around the under margin of a stationary cam $9^a$ which is bolted at 10 to the upper stationary member 4 of the machine. The bolts 10 pass downwardly through portions of the upper member 4 into and through openings in the cam $9^a$ and support against the under side of said cam a stationary internal gear 11 with which a pinion 12 fixed on the upper end of a vertical shaft 13 is in constant mesh. This shaft 13 passes through and is carried by the upper carrier wheel 5; the lower end of the shaft 13 having a fixed pinion 14 which is in constant mesh with the internal gear 15 of the same interior dimension as that of the internal gear 11. The upper pinion 12 is fixed to the upper end of shaft 13 by a screw $12^a$.

The internal gear 15 is secured by bolts 16 to the upper end of a stationary vertical spider 17.

When the carrier shaft 1 is rotated in the clockwise direction the carrier wheels 5 are compelled to rotate with it, and as the shaft 13 is carried bodily by the upper carrier wheel 5 the pinions 12 and 14 of the shaft are carried by the rotating upper carrier wheel 5 in mesh respectively with the upper and under internal gears 11 and 15. The spider 17 has its hubs 18 loose on the shaft 1 and is restrained from rotation with the shaft 1 because the shaft 13 has its fixed upper pinion 12 in mesh with the stationary internal gear 11. As the upper and under internal gears 11 and 15 are connected together in the vertical direction by the shaft 13 and its upper and under pinions and the upper internal gear 11 is stationary, it results that the under internal gear 15 which is fixed to the spider 17 must remain stationary. In other words the shaft 13 with its upper and under pinions 12 and 14 is a form of traveling key; and as the carrier wheels 5 rotate with the shaft, the upper carrier wheel 13, in its clockwise movement and carrying the shaft 13, compels the upper and under pinions 12 and 14 to rotate in constant mesh with the teeth of the internal gears 11 and 15. In their rotation the upper and under carrier wheels 5 which are of equal diameters, carry the vertical carriers 7 in a circular path concentric with the vertical axis of the shaft 1; but the cam groove 9 in the under surface of the cam 9a has a contour somewhat suggestive of an ellipse (Fig. 1) and when the carrier wheels 5 rotate, the carriers 7 by reason of their mechanical connection with the cam groove 9 through their cam arms 8a and cam rolls 8b are each given a rocking movement on its vertical axis, and the shape of the cam groove, which is old and known, serves to project the cotton-picker fingers endwise into a plant, to withdraw them endwise, and serves to determine the further bodily lateral movements of the respective fingers in carrying them to the stripper S and out of contact with the stripper members and continuously around into another cotton-picking position.

The racks above referred to are indicated by 19 and are severally secured by bolts 20 to bosses 20a, one above another, on the outer surface of the vertical spider 17. In horizontal cross-section the spider 17 is the segment of a circle, and it is located with its segmental wall toward the inside of the drum D. As shown there are sixteen carriers 7, and each carrier carries cotton-picker fingers 21 nine of which are shown in the broken illustration of Fig. 2, and each of which has at its butt end a fixed pinion 22. Each picker finger 21 is mounted in a horizontal bushing 21a extending diametrically through a carrier 7, and the picker-finger pinion 22 is at the butt end of the finger. The teeth 23 of the pinion are severally beveled at 24 at their ends toward the free end of the picker finger.

For each horizontal row of picker fingers 21 and their butt end pinions 22, there is provided a horizontal arced pinion-driving rack 19 already referred to, and the teeth 25 of which are preferably on the under side of the rack so as readily to free themselves from detritus.

The teeth of this rack, which is substantially in the arc of a circle, are substantially at right angles to the chord of the arc and are parallel to one another, as shown in Fig. 5; thus corresponding to the parallelism of the picker fingers while they are passing transversely through a cotton plant. And by such construction each finger is permitted to have a rectilinear movement or endwise thrust into the plant and endwise withdrawal from the plant, all under the joint control of the carrier wheels and of the cam groove 9, during the clockwise rotation of the carrier wheels, without loss of the mesh between the rack and finger pinions. During the rectilinear movement or reversing end-thrust of each cotton-picker finger while it is either in the cotton plant or in its cotton-picking position, the cotton-picker fingers are caused to rotate in consequence of the bodily lateral movement of the pinions relatively to the rack, effected by the clockwise rotation of the carrier wheels. The teeth of the picker-finger pinions are in line with the lengthwise axis of the picker fingers.

Each rack has a corresponding end projection 26 parallel with the rack teeth 25. The free end of extension 26 is provided with a pivot pin 27 on which a tooth plate 28 is pivoted. The free end portion of this tooth plate is provided with a projecting tooth 29 on its under edge, and is also provided with an elongated slot 30 between its side edges. A flanged headed pin 31 passes through this slot and the extension 26 and permits the free end of the pivoted plate 28 to be moved downwardly to an extent limited by the upward end of the slot 30, against the stress of a leaf spring 32 an end of which is fixed at 33 to the upper edge of the rack. The forward free end of the spring projects over the upper edge of the tooth plate and tends to keep the tooth 29 down in a position flush with the apex of the adjacent rack tooth 25, which latter and the tooth 29 are spaced laterally apart. The tooth 29 extends inwardly beyond the inward end of the adjacent rack tooth 25. The purpose of this spring-controlled tooth is to insure the initial mesh of a picker-finger pinion 22 with the rack when, in the course of their travel defined by the cam groove, the picker-finger pinions successively return to the entrant end of the rack which is adjacent the spring-controlled tooth. Looking at Fig. 1 it will be seen that the downwardly-pointing picker-finger which is bodily moving laterally in the direction indicated by the arrow, or in clockwise direction, will presently be carried into a position wherein its pinion is to be brought into engagement with the entrant end of the rack. At such moment, owing to the contour of the cam groove 9, the picker finger and its pinion will be given a butt-end rectilinear movement; and to insure intermeshing of the pinion and rack teeth at this moment, the outer inner corner of the tooth 29 is beveled at 34 and the adjacent rack tooth at the corner formed by its inward end and laterally inward side is beveled at 35.

If in the butt-end rectilinear movement of the picker-finger pinion, the butt-end of one of its teeth should strike against the inward end of the spring-controlled tooth 29, the bevel 34 of the tooth 29 will deflect the pinion tooth and permit the spring-controlled tooth to enter between two teeth of the pinion.

If by any possibility a pinion tooth and the spring-controlled tooth 29 should contact endwise in such a way, as they sometimes do in practice, as to exert an up-lifting strain on the spring-controlled tooth, then such up-lifting movement is permitted against the tension of the spring 32, and the pinion tooth apex riding on the apex of the tooth 29, rides off properly into place between the spring-controlled tooth and the next adjacent rack tooth.

If, however, the contact of a pinion tooth and the spring-controlled tooth 29 is such as to force the pinion laterally in the general direction of the other end of the rack so that such pinion tooth does come into contact with an inward end of the adjacent rack tooth, then the bevel 35, working on an adjacent pinion tooth, will throw the pinion tooth into proper alining position with the space between the tooth 29 and the adjacent rack tooth.

To keep the picker fingers from butt-end displacement in their bushings 21ª, a picker-finger keeper 36 is provided and is shown in its preferable form of a bail the free ends of which are loosely pinned at 37 to the sides of a carrier, the crown 38 of the bail being adapted to be moved into frictional engagement with the end-boss 39 of the picker finger, which boss projects at the butt end slightly beyond the butt-end wall of the pinion 22. The crown 38 of the bail and the picker-finger boss 39 are in contact when the bail is in place, and the bail takes the end thrust of the picker finger. The whole bail is resilient and can be sprung against the bearing boss 39 in which position the free ends 40 of the bail, which are concavo-convex, will be moved into spring engagement with the wall of the carrier and held frictionally in place as shown by full lines in Fig. 3, wherein the bail shown in dotted lines is moved down out of picker-finger-engaging position to allow the insertion or removal of the fingers.

In Fig. 2 it will be noticed that various rods 41 are shown in section. These are the rods of the machine which are on opposite sides of the cotton-plant space. It will also be seen that intermediate the picker fingers 21 there are portions of other picker fingers marked $y$, and which fingers project from a drum not shown at that side of the plant space which is opposite the picker finger 21 and the actuating mechanism therefor.

The under hub 18 of the spider bears, on the upper end of the hub of the under carrier wheel 5 for vertical support of the carrier.

The use of the traveling key, above referred to,—that is, of the shaft 13 and its pinions 12 and 14,—is convenient to keep the spider from turning with the shaft 1. This traveling key construction by means of which the upper internal gear 11 which is stationary on the machine framework, and the under internal gear 15 which is fixed to the spider the hubs of which encircle the revoluble shaft 1, are coupled together in a construction that is peculiarly useful herein for the reason that the upper and under corner wheels 5 and the carriers 7 traveling around the shaft 1, constitute a kind of rotating cage which incloses the spider and offers obstacles to the introduction of ordinary mechanical means for keeping the spider stationary. The rack teeth are perpendicular to a diametric plane passed vertically through the axes of the carrier wheels in the lengthwise direction of the drum, and are also, practically speaking, perpendicular to the chord of the arced rack even though the arced rack be not the segment of a true circle.

In Fig. 1 there are three picker fingers shown bracketed by bracket $x$. These three fingers belong to one horizontal series and are supposedly in a cotton plant. The carriers travel in a circular path concentric with the axis of shaft 1, and they also rock on their own axes in consequence of their several connections with the cam groove 9 by means of the cam arms 8ª and the cam rolls 8ᵇ. As the carriers are brought successively into the positions which they have opposite bracket $x$, the lateral movement of the fingers in a circular path is translated into an endwise movement of them by reason of the shape of the cam and by means of said mechanical connections therewith.

What we claim is:

1. In a cotton-picking machine, the combination of a revoluble picker-finger-carrying mechanism comprising a plurality of rockable carriers; a series of revoluble picker-fingers mounted in each carrier and each having a fixed pinion; mechanism for rocking the carriers and thereby determining the paths of the picker fingers during their travel; and a series of stationary arced racks with which the picker-finger pinions intermittently mesh during their travel.

2. In the structure defined by claim 1, the rack having teeth substantially perpendicular to the chords of the arced racks.

3. In the structure defined by claim 1, the rack having teeth approximately perpendicular to the chords of the arced racks, and the pinion teeth having their apexes parallel to the axes of the picker fingers.

4. In a cotton-picking machine, the combination of an arced rack and a picker finger having a fixed pinion meshing with the arced rack, the rack teeth being substantially perpendicular to the chord of the rack.

5. The combination of a picker-finger-carrying mechanism comprising a cage-like assemblage of picker-finger carrier and cage-end-forming carrier wheels; a revoluble shaft on which the wheels are fixed; a spider mounted on the shaft between the wheels; fixed to the spider an annular internal-gear surrounding the shaft; and means for rotaing the internal gear.

6. In a cotton-picking machine, the combination of a picker-finger-carrier, a picker finger detachably mounted in the carrier, and an adjustable picker-finger keeper pivotally connected to the carrier and constructed to be swung into and out of engagement with the butt end portion of the picker finger.

7. The structure defined by claim 6, the keeper being of bail form and having spring ends for engaging the carrier sides adjacent the pivotal connections of the keeper with the carrier.

8. The structure defined by claim 6, the picker finger having a fixed pinion and butt-end projecting bearing against which the keeper is constructed to abut.

9. The combination of a revoluble main shaft; a pair of carrier wheels spaced apart along the length of said shaft and fixed thereto; a series of picker-finger carriers having their opposite ends journaled in the carrier wheels; a cam arm fixed on an end portion of each picker finger carrier; a grooved stationary cam in the groove of which each cam arm has an entrant member; a pair of stationary internal gears; a revoluble shaft carried by one of the carrier wheels and provided with two pinions each constantly in mesh with one of the stationary internal gears; a stationary spider located between said carrier wheels and one of said internal gears being fixed to it; and on each of the picker-finger carriers a series of revoluble picker fingers each provided with a driving pinion and for each picker-finger driving pinion an arced rack fixed to the spider.

10. In the structure of claim 9, the spider being provided with arms having hubs loosely inclosing the main shaft for supporting the spider.

In testimony whereof we have hereunto set our hands this 5th day of December, 1917.

THEODORE H. PRICE.
BRUCE CLARK WHITE.
WALTER J. DUDLEY.